(12) United States Patent
Park et al.

(10) Patent No.: US 9,129,580 B2
(45) Date of Patent: Sep. 8, 2015

(54) METHODS AND APPARATUS FOR LATCH-UP FREE BOOSTING

(71) Applicant: SAMSUNG ELECTRONICS CO., LTD., Suwon-si, Gyeonggi-do (KR)

(72) Inventors: Jae-Ho Park, Yongin-si (KR); Won-Sik Kang, Seoul (KR)

(73) Assignee: SAMSUNG ELECTRONICS CO., LTD., Suwon-si, Gyeonggi-do (KR)

(*) Notice: Subject to any disclaimer, the term of this patent is extended or adjusted under 35 U.S.C. 154(b) by 0 days.

(21) Appl. No.: 14/316,179

(22) Filed: Jun. 26, 2014

(65) Prior Publication Data

US 2014/0307191 A1 Oct. 16, 2014

Related U.S. Application Data

(62) Division of application No. 11/826,374, filed on Jul. 13, 2007, now Pat. No. 8,902,214.

(30) Foreign Application Priority Data

Sep. 29, 2006 (KR) .................. 10-2006-0095920

(51) Int. Cl.
*G09G 5/00* (2006.01)
*G09G 3/36* (2006.01)
*H02M 3/07* (2006.01)
*G02F 1/133* (2006.01)
*H02M 1/00* (2007.01)

(52) U.S. Cl.
CPC .......... *G09G 3/3696* (2013.01); *G02F 1/13306* (2013.01); *H02M 3/07* (2013.01); *G09G 3/3648* (2013.01); *G09G 2330/02* (2013.01); *G09G 2330/04* (2013.01); *H02M 2001/009* (2013.01)

(58) Field of Classification Search
USPC .................................... 345/211–214
See application file for complete search history.

(56) References Cited

U.S. PATENT DOCUMENTS

| 6,794,707 B1 | 9/2004 | Cao |
| 2003/0067429 A1 | 4/2003 | Aoki et al. |
| 2004/0021616 A1 | 2/2004 | Goto et al. |
| 2005/0062520 A1 | 3/2005 | Kim et al. |

FOREIGN PATENT DOCUMENTS

| JP | 2001-250381 A | 9/2001 |
| JP | 2003-037487 A | 2/2003 |
| JP | 2003-107520 A | 4/2003 |
| KR | 10-0137317 B1 | 2/1998 |
| KR | 10-1998-0071820 A | 10/1998 |
| KR | 10-0177784 B1 | 11/1998 |
| KR | 10-2003-0028710 A | 4/2003 |
| KR | 10-2003-0082239 A | 10/2003 |
| KR | 10-2004-0054483 A | 6/2004 |
| KR | 10-2004-0068239 A | 7/2004 |
| KR | 10-2005-0029813 A | 3/2005 |
| KR | 10-2005-0103544 A | 11/2005 |
| KR | 10-2006-0020235 A | 3/2006 |

*Primary Examiner* — Dennis Joseph
(74) *Attorney, Agent, or Firm* — Lee & Morse, P.C.

(57) ABSTRACT

A voltage generator includes a boosting circuit boosting a power voltage to generate first through fourth voltages, and a boosting controller controlling the boosting circuit. The boosting controller sets the third and fourth voltages to a voltage level lower than that of a ground voltage while the first and second voltages are generated, so that a plurality of voltages may be stably generated, i.e., without latch-up.

6 Claims, 11 Drawing Sheets

METHODS AND APPARATUS FOR LATCH-UP FREE BOOSTING

CROSS REFERENCE TO RELATED APPLICATION

This is a divisional application based on pending application Ser. No. 11/826,374, filed Jul. 13, 2007, the entire contents of which is hereby incorporated by reference.

BACKGROUND OF THE INVENTION

1. Field of the Invention

Embodiments of the present invention relate to methods and apparatus for boosting a voltage when power is turned on ("power-on"). More particularly, embodiments of the invention relate to latch-up free voltage boosting methods and apparatuses for stably boosting voltages without triggering latch-up.

2. Description of the Related Art

Generally, a peculiar state called latch-up may occur in a device having a complementary metal oxide semiconductor (CMOS) structure. Latch-up is a parasitic phenomenon that may occur when a parasitic thyristor, e.g., silicon controlled rectifier (SCR), at a PNPN junction inherently existing in a CMOS chip causes over-current to flow. Depending on the circuitry, the amount of current produced may be large enough to permanently destroy a chip including the CMOS structure. Latch-up generally occurs when input and output voltages exceed a rated level so that large current flows through an internal component, or when a power voltage exceeds the rated level so that the internal component falls into a breakdown state. Once the chip falls into a latch-up state, the latch-up state may be continuously maintained until power is turned off ("power-off") due to the structure of the thyristor. Therefore, the chip may be permanently destroyed.

To perform a variety of functions, the CMOS chip may be designed such that it operates using voltages of various levels. When power is initially supplied to the CMOS chip from the outside, the CMOS chip may generate various voltages to be used inside the CMOS chip in sequence or in parallel by boosting a power voltage provided from the outside. When the voltages applied to respective terminals of the PNPN junction are different from one another, latch-up may occur according to the sequence in which the various voltages are applied to the respective terminals.

SUMMARY OF THE INVENTION

Embodiments of the present invention are therefore directed to methods and apparatus employing a latch-up free boosting scheme, which substantially overcome one or more of the problems due to the limitations and disadvantages of the related art.

It is therefore a feature of an embodiment of the present invention to provide latch-up free boosting methods capable of stably generating a plurality of voltages without triggering latch-up.

It is therefore a separate feature of an embodiment of the present invention to provide latch up free boosting apparatus, which are capable of stably generating a plurality of voltages without triggering latch-up.

It is therefore a separate feature of an embodiment of the present invention to provide a voltage generator that may variably control a time taken for the substrate voltage to be set to a voltage lower than a ground voltage at power-on.

At least one of the above and other features and advantages of the present invention may be realized by providing a boosting method, including receiving a power voltage, boosting the power voltage to generate a first voltage, boosting the first voltage to generate a second voltage, and generating a third voltage that is a negative voltage of the second voltage, wherein the third voltage is set to a voltage level lower than that of a ground voltage while the first and second voltages are generated.

The third voltage may be a substrate voltage. The third voltage may be a negative voltage of the power voltage while the first and second voltages are generated.

A time taken for the third voltage to be set to a negative voltage of the power voltage while the first and second voltages are generated may be controlled.

At least one of the above and other features and advantages of the present invention may be realized by providing a voltage generator, including a boosting circuit boosting a power voltage to generate first through fourth voltages, and a boosting controller controlling the boosting circuit such that the third and fourth voltages are set to a voltage level lower than that of a ground voltage while the first and second voltages are generated.

The boosting circuit may include a first booster boosting the power voltage to generate the first voltage, a second booster receiving the power voltage, the first voltage and the fourth voltage to generate the second and third voltages, and a third booster receiving the power voltage to generate the fourth voltage.

The boosting controller may generate first and second control signals for controlling the second booster, and may generate a third control signal for controlling the third booster. The second booster may include a first boosting unit generating a fifth voltage lower than the ground voltage.

The second booster may further include a first switching unit outputting the fifth voltage as the third voltage in response to the first and second control signals. The first switching unit may apply the fifth voltage to the substrate in response to the first control signal. The second booster may further include a second switching unit transmitting the fifth voltage applied to the substrate as the third voltage in response to the second control signal.

The second booster may further include a third switching unit transmitting the fifth voltage as the fourth voltage in response to the third switching control signal. The first through third switching control signals may be sequentially activated at predetermined intervals.

The first and second switching control signals may be simultaneously activated, and the third switching control signal may be activated after a lapse of a predetermined time from when the first and second switching control signals are simultaneously activated. The first through third switching control signals may be simultaneously activated. The second booster may further include a second boosting unit receiving the power voltage and the first voltage to generate the second voltage. The second booster may further include a third boosting unit receiving the power voltage and the second voltage to generate the third voltage.

At least one of the above and other features and advantages of the present invention may be realized by providing a liquid crystal display device, including a liquid crystal panel displaying an image, and a voltage generator receiving a power voltage to generate first through fourth voltages for driving the liquid crystal panel, wherein the voltage generator includes a first booster boosting the power voltage to generate the first voltage, a second booster receiving the power voltage, the first voltage and the fourth voltage to generate the second and third voltages, a third booster receiving the power voltage to generate the fourth voltage, and a controller controlling the second and third boosters such that the third and fourth voltages are set to a voltage level lower than that of a ground voltage while the first and second voltages are generated.

The first voltage may be an internal power voltage, the second voltage may be a gate-on voltage for driving gate lines of the liquid crystal panel, the third voltage may be a gate-off voltage for driving the gate lines of the liquid crystal panel, and the fourth voltage may be a voltage for generating a common voltage supplied to the liquid crystal panel. The controller may generate first and second control signals for controlling the second booster, and may generate a third control signal for controlling the third booster.

BRIEF DESCRIPTION OF THE DRAWINGS

The above and other features and advantages of the present invention will become more apparent to those of ordinary skill in the art by describing in detail exemplary embodiments thereof with reference to the attached drawings, in which.

DETAILED DESCRIPTION OF THE INVENTION

Figure 1:
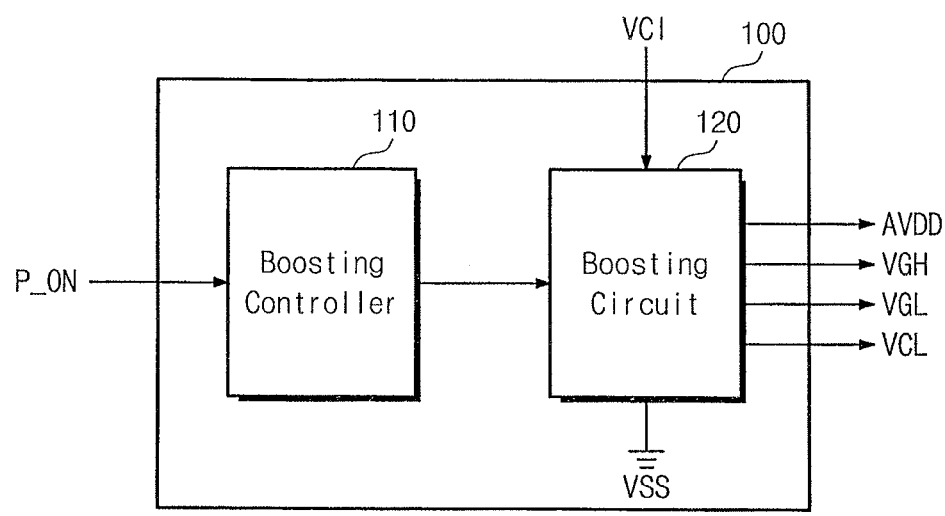
FIG. 1 illustrates a block diagram of a voltage generator according to an exemplary embodiment of the present invention.

Korean Patent Application No. 10-2006-95920, filed on Sep. 29, 2006, in the Korean Intellectual Property Office, and entitled: "Latch-Up Free Boosting Scheme," is incorporated by reference herein in its entirety.

Embodiments of the present invention will now be described more fully hereinafter with reference to the accompanying drawings, in which exemplary embodiments of the invention are illustrated. Embodiments of the invention may, however, be embodied in different forms and should not be construed as limited to the exemplary embodiments set forth herein. Rather, these exemplary embodiments are provided so that this disclosure will be thorough and complete, and will fully convey the scope of the invention to those skilled in the art.

In the figures, the dimensions of layers and regions may be exaggerated for clarity of illustration. It will also be understood that when an element is referred to as being connected to another element or between two elements, the element may be directly connected to the other element or directly between the two other elements and/or one or more intervening elements may be present. Like reference numerals refer to like elements throughout the specification.

FIG. 1 illustrates a block diagram of a voltage generator according to an exemplary embodiment of the present invention. Referring to FIG. 1, the voltage generator 100 may include a boosting controller 110 and a boosting circuit 120. The boosting controller 110 may generate control signals for controlling the boosting circuit 120 in response to a power-on signal P_ON. The boosting circuit 120 may receive a power voltage VCI to generate first through fourth boosting voltages AVDD, VGH, VGL and VCL in response to the control signals of the boosting controller 110. The first through fourth boosting voltages AVDD, VGH, VGL and VCL may be used in an electronic device including the voltage generator 100, e.g., a computer system, a liquid crystal display device, a personal multimedia player (PMP), a mobile phone, an MP3 player, an audio system, etc. Although the exemplary embodiment illustrated in FIG. 1 illustrates the boosting circuit 120 as generating the first through fourth boosting voltages AVDD, VGH, VGL and VCL, embodiments of the invention are not limited thereto. For example, a number and level of each voltage generated by the boosting circuit 120 may be variously modified depending on specifications required in electronic devices.

Figure 2:
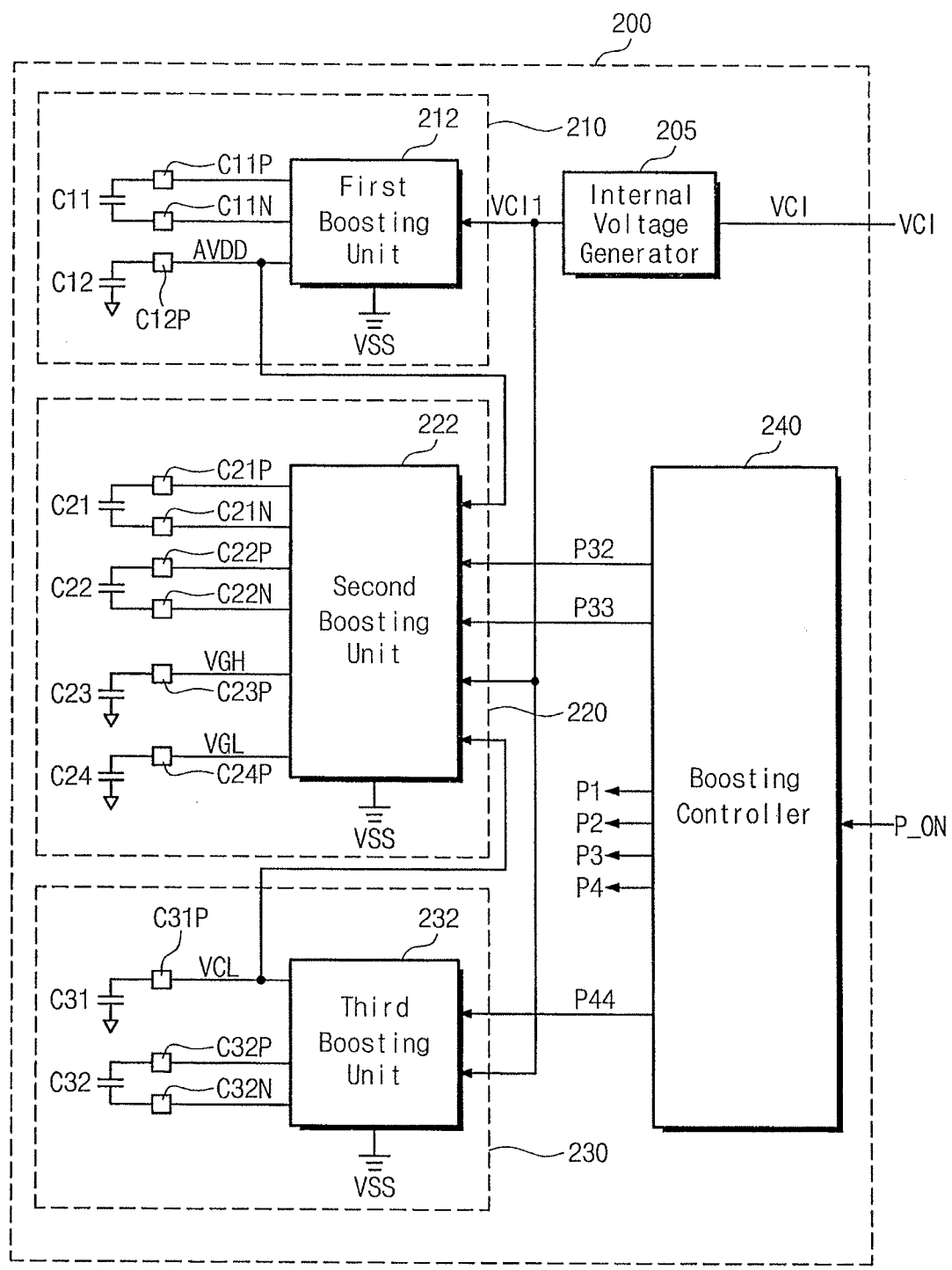
FIG. 2 illustrates a block diagram of a voltage generator according to another exemplary embodiment of the present invention.

FIG. 2 illustrates a block diagram of a voltage generator according to another exemplary embodiment of the present invention.

Referring to FIG. 2, the voltage generator 200 may include an internal voltage generator 205, first through third boosting circuits 210, 220, 230, and a boosting controller 240. The boosting controller 240 may generate switching control signals P32, P33 and P44 for controlling the second and third boosting circuits 220 and 230 in response to the power-on signal P_ON. The internal voltage generator 205 may receive the power voltage VCI to generate an internal power voltage VCI1.

The first boosting circuit 210 may include a first boosting unit 212 and capacitors C11 and C12. The capacitor C11 may be connected to the first boosting unit 212 through terminals C11P and C11N, and the capacitor C12 may be connected to the first boosting unit 212 through a terminal C12P. The first boosting circuit 210 may receive the internal power voltage VCI1 to output the first boosting voltage AVDD to the terminal C12P.

The second boosting circuit 220 may include a second boosting unit 222 and capacitors C21, C22, C23 and C24. The capacitor C21 may be connected to the second boosting unit 222 through terminals C21P and C21N, and the capacitor C22 may be connected to the second boosting unit 222 through terminals C22P and C22N. One end of the capacitor C23 may be connected to the second boosting unit 222 through a terminal C23P, and one end of the capacitor C24 may be connected to the second boosting unit 222 through a terminal C24P. Other ends of the capacitors C23 and C24 may be connected to a ground voltage, respectively. The second boosting circuit 220 may receive the internal power voltage VCI1, the first voltage AVDD of the first boosting circuit 210, and the fourth boosting voltage VCL of the third boosting circuit 230, and may output second and third boosting voltages VGH and VGL to the respective terminals C23P and C24P in response to control signals P32 and P33.

The third boosting circuit 230 may include a third boosting unit 232 and capacitors C31 and C32. One end of the capacitor C31 may be connected to the third boosting unit 232 through a terminal C31P, and the capacitor C32 may be connected to the third boosting unit 232 through terminals C32P and C32N. The third boosting circuit 230 may receive the internal power voltage VCI1 to generate the fourth boosting voltage VCL to the terminal C31P in response to the switching control signal P44 provided from the boosting controller 240.

The second boosting circuit 220 may receive the internal power voltage VCI1, the first boosting voltage AVDD of the first boosting circuit 210, and the fourth boosting voltage VCL of the third boosting circuit 230 to generate the second and third boosting voltages VGH and VGL. When the fourth boosting voltage VCL is supplied to the second boosting unit 222 before it is not sufficiently stabilized to a normal voltage level, latch-up may occur in the second boosting unit 222.

Figure 3:
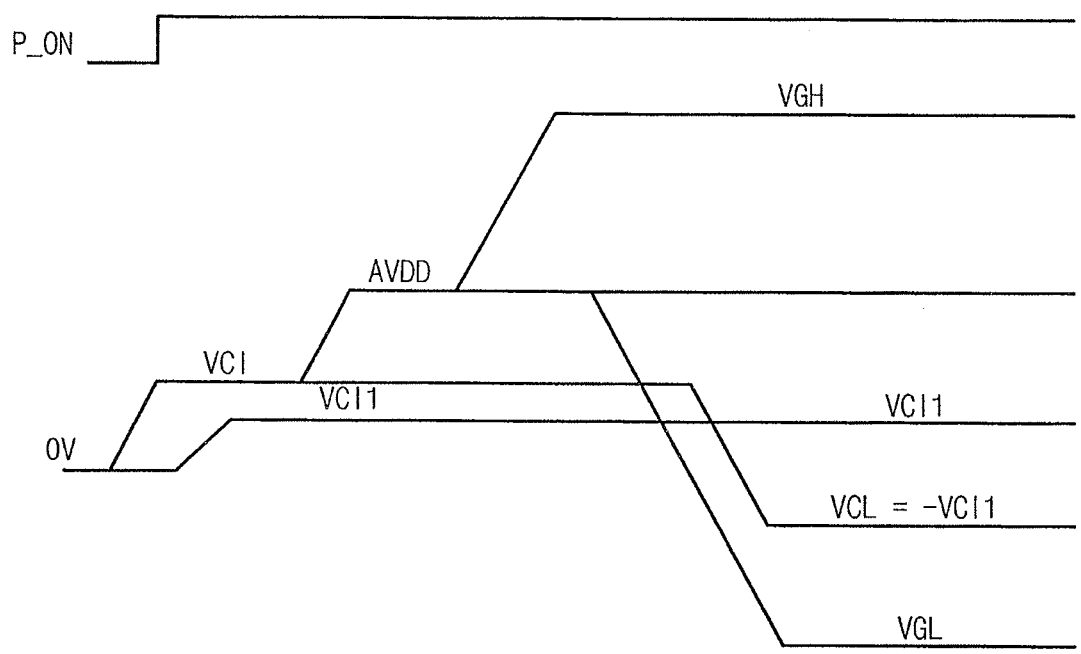
FIG. 3 illustrates a diagram of first through fourth voltages generated from first through third boosting circuits of FIG. 2.

FIG. 3 illustrates a diagram of waveforms of first through fourth boosting voltages AVDD, VGH, VGL and VCL that may be generated from first through third boosting circuits 210, 220, 230 of FIG. 2. As described above, in some embodiments, the first boosting circuit 210 may boost the internal power voltage VCI1 to output the first boosting voltage AVDD.

The second boosting circuit 220 may receive the internal power voltage VCI1, the first boosting voltage AVDD and the fourth boosting voltage VCL to generate the second and third boosting voltages VGH and VGL. More particularly, the second boosting circuit 220 may boost the first boosting voltage AVDD to a negative voltage to thereby generate the third boosting voltage VGL. As shown in FIG. 3, the third boosting voltage VGL may not be generated until the internal power voltage VCI1 and the first and second boosting voltages AVDD and VGH are generated, e.g., the third boosting voltage VGL may be generated after the internal power voltage VCI1, and the first and second boosting voltages AVDD and VGH are generated. Thus, the terminal C24P may be in a floating state or connected to a Schottky diode (not shown). Referring to FIG. 3, in such cases in which the second boosting voltage VGH may be set to a desired level after the internal power voltage VCI1 is set, there is a possibility that latch-up may occur in the second boosting circuit 220, as described in more detail below.

Figure 4A:
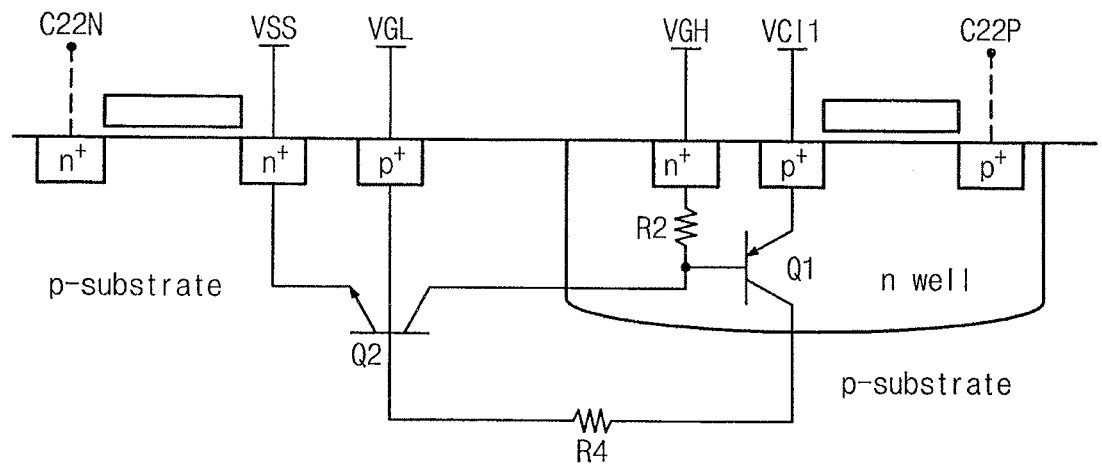
FIG. 4A illustrates a schematic view of sections of NPN and PNP transistors.
Figure 4B:
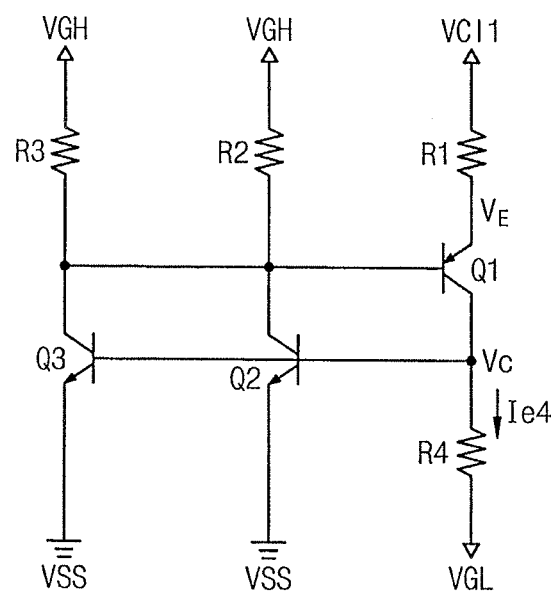
FIG. 4B illustrates an equivalent circuit diagram of the NPN and PNP transistors of FIG. 4A.

FIG. 4A illustrates a schematic view of sections of NPN and PNP transistors; and FIG. 4B illustrates an equivalent circuit diagram of the NPN and PNP transistors of FIG. 4A.

Referring to FIGS. 4A and 4B, the third boosting voltage VGL may be a substrate bias voltage. When power is on, the internal power voltage VCI1 and the first and second boosting voltages AVDD, VGH may be generated by the voltage generator 200 in the following order: the internal power voltage VCI1, the first voltage AVDD, and the second voltage VGH, as illustrated in FIG. 3. When an emitter voltage of a PNP transistor Q1 is greater than a base voltage thereof, an emitter current flows to the collector of the PNP transistor Q1. Since the emitter of the PNP transistor Q1 may be connected to the input voltage, e.g., internal power voltage VCI1, and the base may be in a floating state before boosting, an emitter-base voltage may be a forward bias voltage, i.e., $V_E = V_{BE} \approx 0.7V$, and the emitter current may be expressed as $I_E = (VCI1 - V_E)/R1$ provided that an initial voltage is set to 0V. A collector voltage of the PNP transistor Q1 may be expressed as $V_C = VGL + Ie4*R4$, and thus, $V_C$ will be a positive voltage if $|VGL| < |Ie4*R4|$. Therefore, the positive collector voltage $V_C$ of the PNP transistor Q1 may enable an NPN transistor Q2 to be turned on. Likewise, an NPN transistor Q3 may also be turned on. As the NPN transistors Q2 and Q3 are turned on, a current path may be formed between the second boosting voltage VGH and the ground voltage VSS. As a result, latch-up may occur because the PNP transistor Q1 and the NPN transistors Q2 and Q3 may all be turned on.

As described above, if latch-up occurs due to, e.g., instant forward biasing at power-on, the semiconductor chip will generally, if not always, need to be discarded, i.e., be permanently damaged. To prevent and/or reduce latch-up, a Schottky diode (not shown) may be connected between the third boosting voltage VGL and the ground voltage VSS, e.g., to terminal C24P shown in FIG. 2. However, employing a Schottky diode may increase a fabrication cost of a semiconductor chip, and may further lead to a problem that the Schottky diode may be destroyed if a difference between the emitter voltage of the NPN transistor Q2 and the third voltage VGL becomes great.

In the voltage generator 200 according to the exemplary embodiment of the present invention, the third boosting voltage VGL may be set to a negative level lower than the ground voltage VSS, e.g., −VCI1 (i.e., negative internal power voltage), so that the NPN transistors Q2 and Q3 are not turned on. That is, if $|VGL| > |Ie4*R4|$, the collector voltage $V_C$ there may be a negative (minus) voltage. Accordingly, the NPN transistor Q2 may not be turned on.

Figure 5:
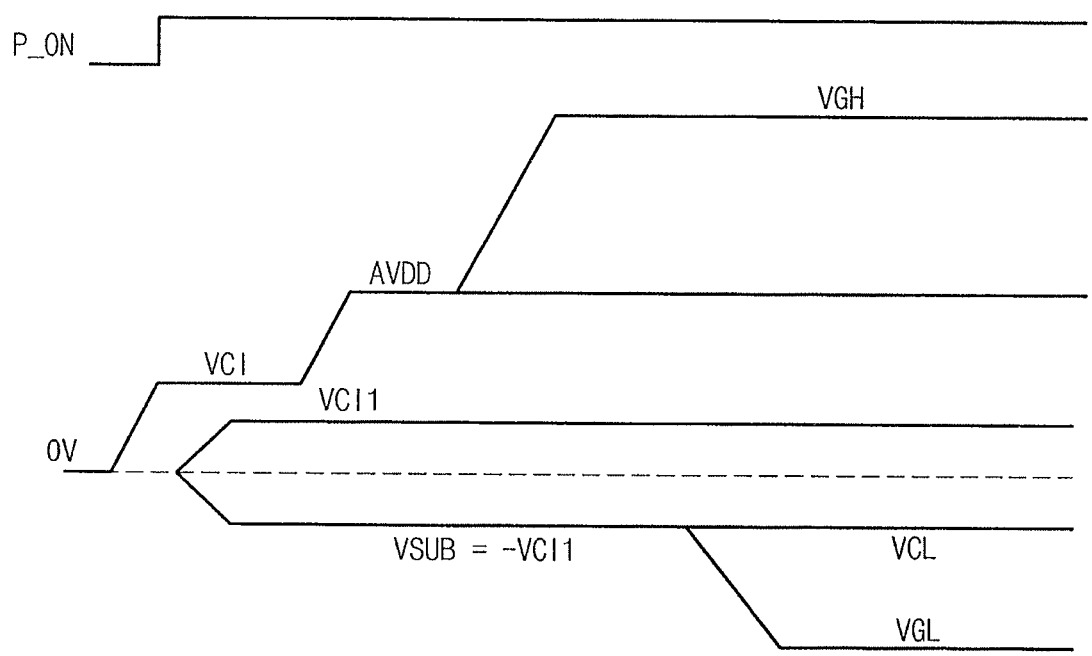
FIG. 5 illustrates a diagram of voltages generated from the voltage generator of FIG. 2 according to an exemplary embodiment of the present invention.

FIG. 5 illustrates an exemplary diagram of voltages generated from the voltage generator 200 of FIG. 2 according to an exemplary embodiment of the present invention. Referring to FIG. 5, the third and fourth boosting voltages VGL and VCL may be set to the negative internal power voltage −VCI1 at the same time as, e.g. when the internal power voltage VCI1 is generated. Therefore, referring to FIGS. 4 and 5, the transistors Q2 and Q3 may not be turned on before the second voltage VGH is set to a desired level. Consequently, in such exemplary embodiments, latch-up may be reduced and/or prevented.

Figure 6:
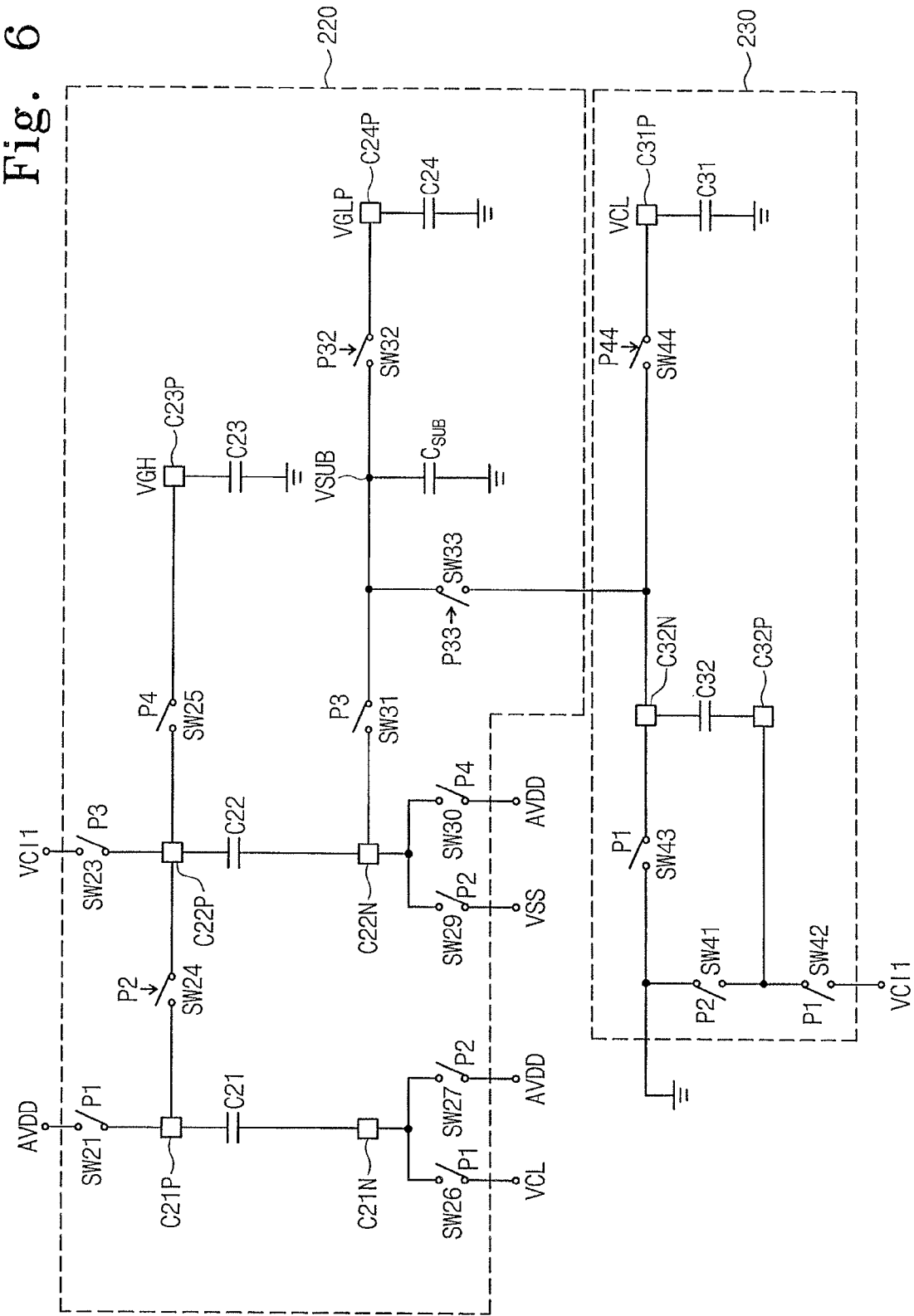
FIG. 6 illustrates a circuit diagram of an embodiment of the second and third boosting circuits of FIG. 2.

FIG. 6 illustrates a circuit diagram of an embodiment of the second and third boosting circuits 220, 230 of FIG. 2. The second and third boosting circuits 220 and 230 of FIG. 6 are exemplary embodiments, and thus, embodiments of the invention are not limited thereto. More particularly, e.g., various modifications may be made thereto for generating the second through fourth voltages VGH, VGL and VCL.

Figure 7:
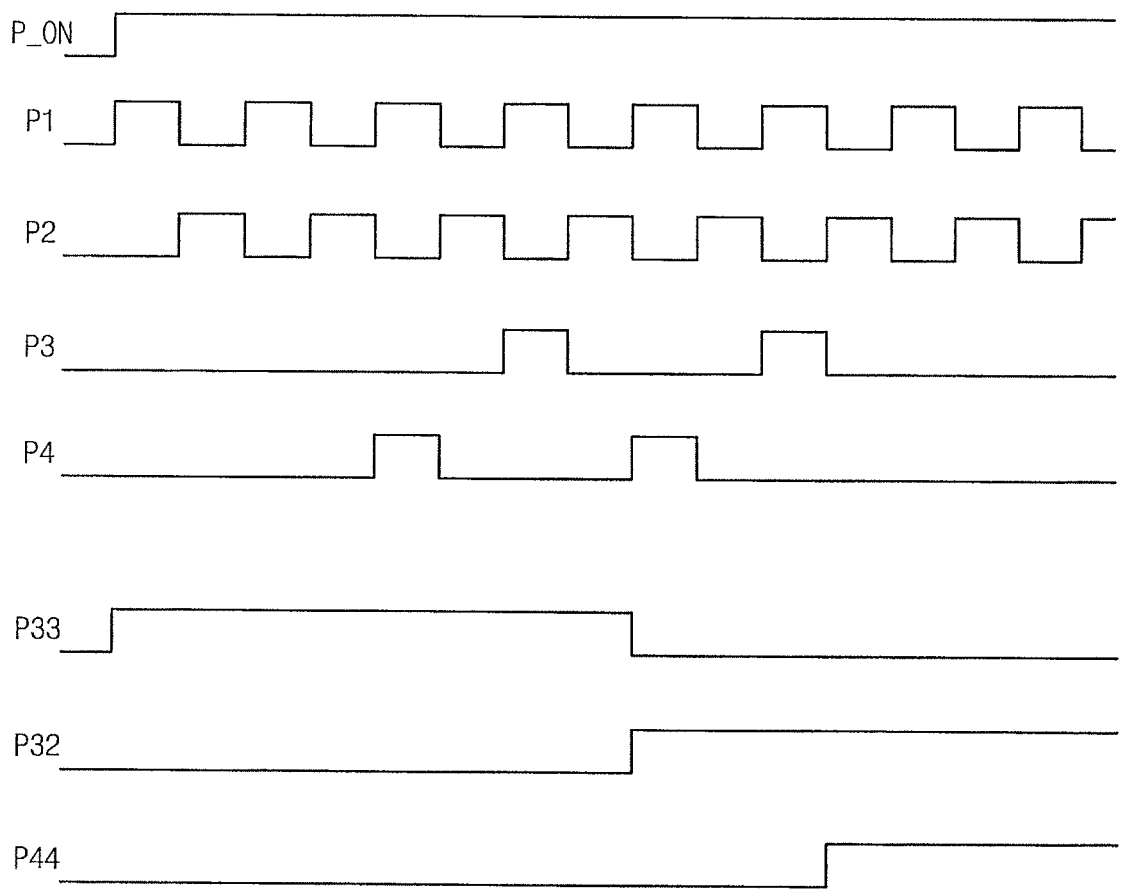
FIGS. 7 through 9 illustrate timing diagrams of various exemplary embodiments of switching control signals.
Figure 8:
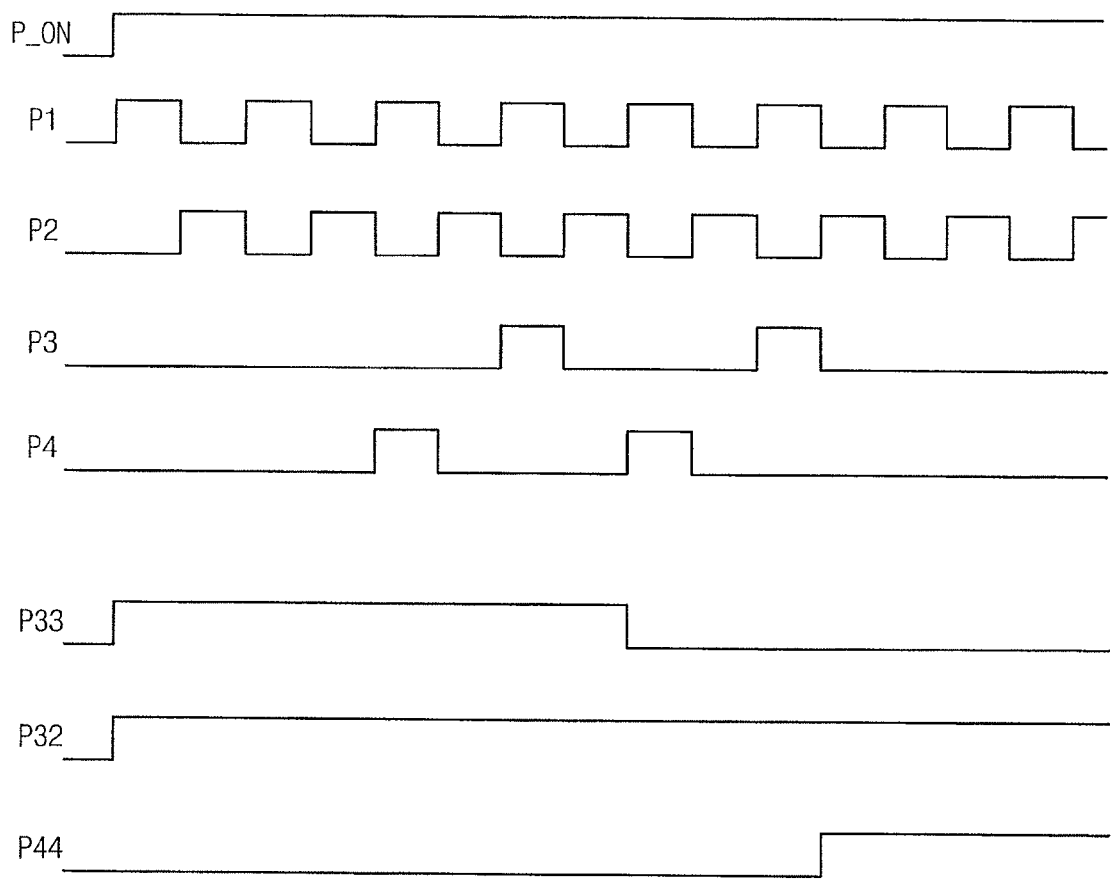
Figure 9:
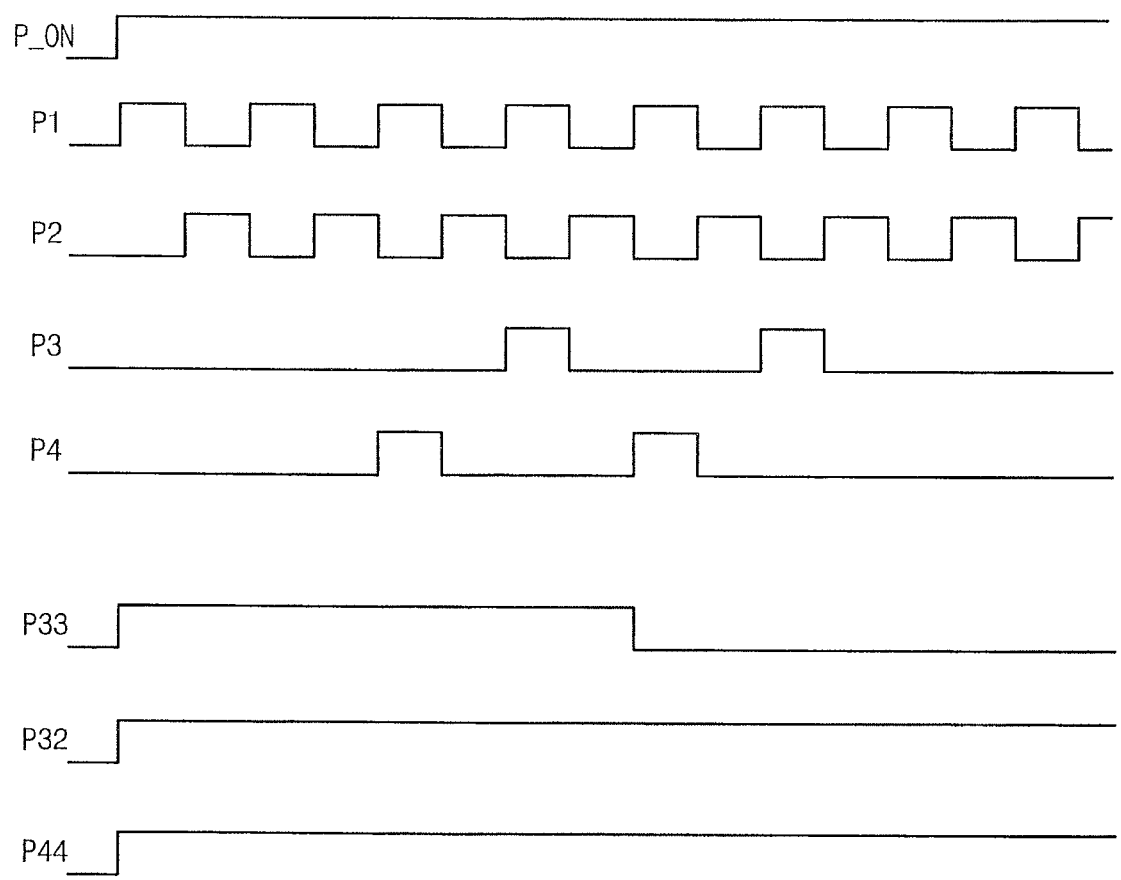

Referring to FIG. 6, the second boosting circuit 220 may include capacitors C21, C22, C23 and C24, and a plurality of switches SW21, SW23, SW24, SW25, SW26, SW27, SW29, SW30, SW31, SW32, SW33. The third boosting circuit may 230 include capacitors C31 and C32, and a plurality of switches SW41, SW42, SW43, and SW44. The switching control signals P1, P2, P3, P4, P32, P33 and P44 may be provided from the boosting controller 240 of FIG. 2 to control ON/OFF operation of the switches SW21, SW23, SW24, SW25, SW26, SW27, SW29, SW30, SW31, SW32, SW33, SW41, SW42, SW43 and SW44. FIGS. 7 through 9 illustrate timing diagrams of various exemplary embodiments of switching control signals P1, P2, P3, P4, P32, P33 and P44.

Referring to FIGS. 6 and 7, when the switches SW21 and SW26 are turned on in response to the switching control signal P1, the terminal C21P may be charged to a voltage corresponding to a voltage difference between the first and fourth boosting voltages, i.e., AVDD−VCL. When the switches SW24, SW27 and SW29 are turned on in response to the switching control signal P2, a voltage of the terminal C22P may increase to a voltage corresponding to a voltage difference between twice the first boosting voltage and the fourth boosting voltage, i.e., 2AVDD−VCL, due to the capacitor C21. When the switches SW25 and SW30 are turned on in response to the switching control signal P4, a voltage of the terminal C23P may increase to a voltage corresponding to a difference between three times the first boosting voltage and the fourth boosting voltage, i.e., 3AVDD−VCL. Therefore, the second voltage VGH, i.e., the voltage of the terminal C23P, may be 3AVDD−VCL. In some embodiments of the invention, if the voltage connected to the switches SW27 and SW30 is/are changed to other voltages, e.g., the internal power voltage VCI1 instead of the first boosting voltage AVDD, the voltage level of the second voltage VGH may be variously modified.

When the switches SW23 and SW31 are turned on in response to the switching control signal P3, the third boosting voltage VGL may be applied to the terminal C24P through the switch SW32, and may correspond to −(2AVDD−VCL+VCI1). In embodiments of the invention, the third boosting voltage VGL applied to the terminal C24P may be changed by varying the voltages applied to respective terminals of the switches SW23 and SW30.

Meanwhile, charges may be accumulated in the capacitor C32 in response to the control signals P1 and P2 from a time when the power-on signal P_ON is activated. When the switch SW33 is turned on in response to the switching control signal P33, a substrate voltage VSUB may be set to the negative internal power voltage −VCI1. As described above, latch-up may occur at a PNPN junction, and thus, may occur at the terminals C22P and C22N of FIG. 6 (see FIG. 4A). In the embodiment of the present invention, however, the substrate voltage VSUB is set to the negative internal power voltage −VCI1 lower than the ground voltage VSS from the time when power is turned on, which makes it possible to prevent and/or reduce latch-up. Subsequently, when the switch S32 is turned on in response to the switching control signal P32, the voltage of the terminal C24P, i.e., the third voltage VGL, may be set to the negative internal power voltage −VCI1. Afterwards, when the switch SW33 is turned off in response to the switching control signal P33 of low level, and the switch SW44 is turned on in response to the switching control signal P44 of high level, the fourth voltage VCL applied to the terminal C31P may be set to the negative internal power voltage −VCI1.

FIGS. 8 and 9 are timing diagrams illustrating various embodiments of switching control signals P32, P33 and P44. Referring to FIGS. 6 and 8, in embodiments in which the activation transition point of the switching control signal P32 is set to be the same as that of the switching control signal P33, the third voltage VGL may be set to the negative internal power voltage −VCI1 simultaneously with the substrate voltage VSUB. Alternatively, referring to FIGS. 6 and 9, in embodiments in which the activation transition points of the switching control signals P32 and P44 are set to be the same as that of the switching control signal P33, the third voltage VGL and the fourth voltage VCL may set to the negative internal power voltage −VCI1 simultaneously with the substrate voltage VSUB.

Since three capacitors $C_{SUB}$, C24 and C31 may be charged by the current supplied from the internal voltage generator 205 of FIG. 2, the amount of current may increase. When the time(s) at which that the third and fourth voltages VGL and VCL are set to the negative internal power voltage −VCI1 are set to be the same as that of the substrate voltage $V_{SUB}$ as illustrated in FIGS. 8 and 9, it generally takes a lot of time for the substrate voltage $V_{SUB}$ to reach a target voltage, i.e., the negative internal power voltage −VCI1. However, since an equivalent capacitance appearing in the substrate SUB becomes enormously large, the voltage rise caused by leakage current may be prevented more effectively than when the signals illustrate in FIG. 7 are employed. In other words, in embodiments of the invention, it is possible to selectively design activation transition points of the switching control signals P33, P32 and P44 in consideration of trade-off relationship, depending on whether it is desired to rapidly lower the substrate voltage VSUB (as shown in FIG. 7), or prevent the voltage rise of the substrate voltage VSUB caused by the inflow of external leakage current (as shown in FIG. 8, $C_{TOT}=C_{SUB}+C_{24}$).

Figure 10:
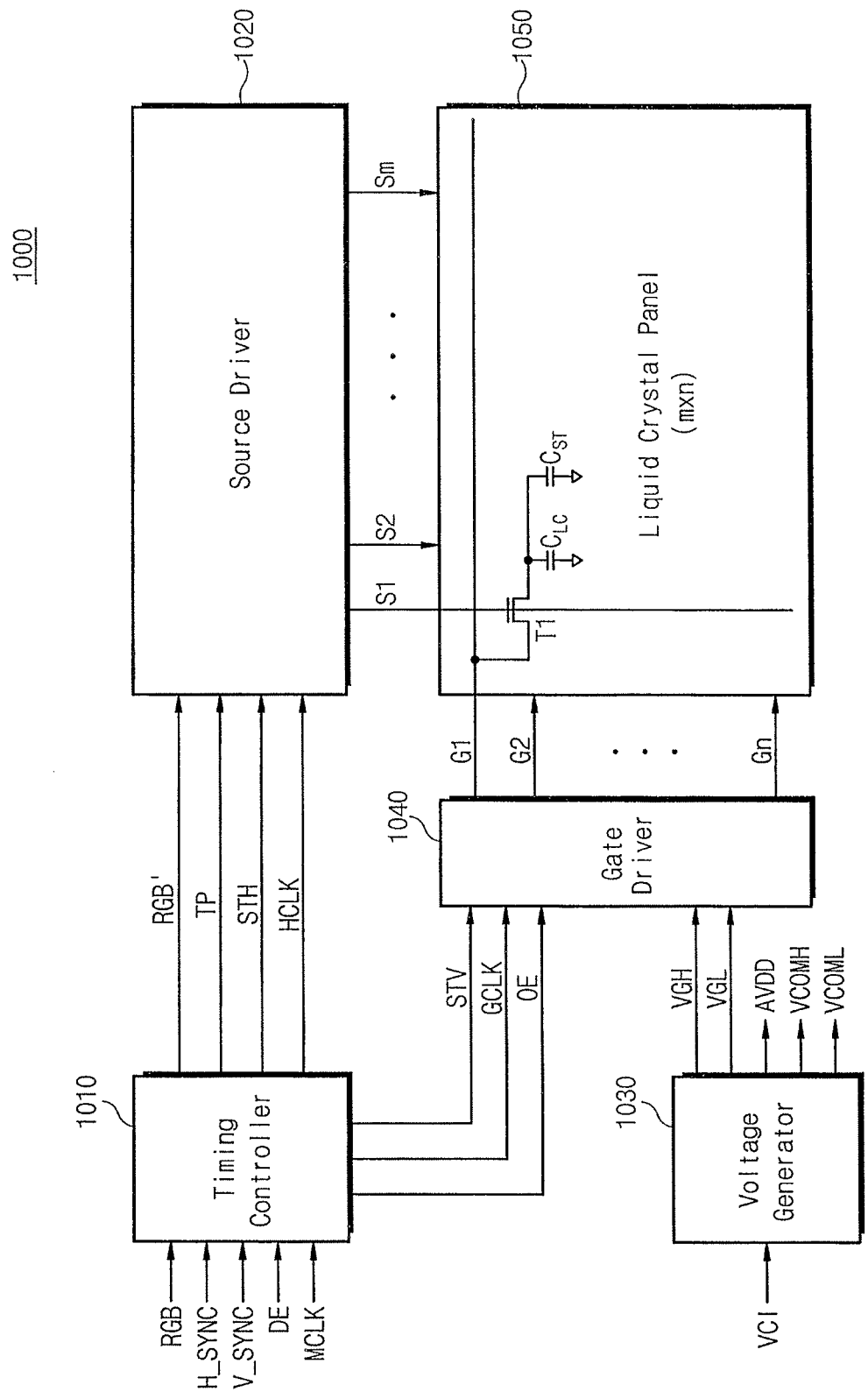
FIG. 10 illustrates a block diagram of a liquid crystal display device including a voltage generator according to an exemplary embodiment of the present invention.

FIG. 10 illustrates a block diagram of a liquid crystal display device (LCD) 1000 including a voltage generator according to an exemplary embodiment of the present invention.

Referring to FIG. 10, the LCD 1000 may include a timing controller 1010, a source driver 1020, a voltage generator 1030, a gate driver 1040, and a liquid crystal panel 1050.

The liquid crystal panel 1050 may include a plurality of gate lines G1-Gn, a plurality of source lines S1-Sm crossing the plurality of gate lines G1-Gn, and a plurality of pixels arranged in regions defined by the gate lines and data lines. Each of the pixels may include a thin film transistor (TFT) T1 of which gate and source electrodes may be respectively connected to the gate line and the data line, a liquid crystal capacitor $C_{LC}$ connected to a drain electrode of the TFT T1, and a storage capacitor $C_{ST}$. In such a pixel structure, when the gate lines G1-Gn are sequentially selected by the gate driver 1040 and a pulse type gate-on voltage is applied to the selected gate line, the TFT T1 of the pixel connected to the selected gate line may be turned on, and a voltage containing pixel information may then be applied to each of the data lines by the source driver 1020. This voltage may be applied to the liquid crystal capacitor $C_{LC}$ and the storage capacitor $C_{ST}$ through the TFT in the corresponding pixel to drive the liquid and storage capacitors $C_{LC}$ and $C_{ST}$. Thus, a predetermined display operation can be performed.

The timing controller 1010 may receive a current pixel data signal RGB, a horizontal synchronization signal H_SYNC, a vertical synchronization signal V_SYNC, a clock signal MCLK, and a data enable signal DE, which may be inputted from external devices. The timing controller 1010 may output a pixel data signal RGB' and control signals to the source driver 1020, wherein a data format of the pixel data signal RGB' may be converted to meet interface specification(s) with the source driver 1020. The control signals supplied to the source driver 1020 from the timing controller 1010 may include a latch signal TP, a start horizontal signal STH, and a horizontal clock signal HCLK.

The voltage generator 1030 may receive the power voltage VCI from the outside to generate a variety of voltages required for the operation of the LCD 1000, e.g., a gate-on voltage VGH (e.g., the second boosting voltage), a gate-off voltage VGL (e.g., the third boosting voltage), an analog power voltage AVDD (e.g., the first boosting voltage), a gate-on common voltage VCOMH, and a gate-off common voltage VCOML. The gate-on voltage VGH and the gate-off voltage VGL may be supplied to the gate driver 1040, and the analog power voltage AVDD may be used as an operational voltage of the LCD 1000.

The gate driver 1040 may sequentially scan the gate lines G1-Gn of the liquid crystal panel 1050 in response to the control signals, i.e., a start vertical signal STV, a gate clock signal GCLK, and an output enable signal OE, supplied from the timing controller 1010. Scanning may be an operation for sequentially applying the gate-on voltage VGH to the gate lines to enable the pixel of the gate line to which the gate-on voltage VGH is applied to be in a state that data can be written thereto.

The source driver 1020 may be responsive to the control signals, i.e., the latch signal TP, the start horizontal signal STH and the horizontal clock signal HCLK, supplied from the timing controller 1010, to thereby drive the data lines D1-Dm of the liquid crystal panel 1050 with gradation voltages corresponding to the pixel data signals RGB' among a plurality of gradation voltages generated from a gradation voltage generator (not shown).

Figure 11:
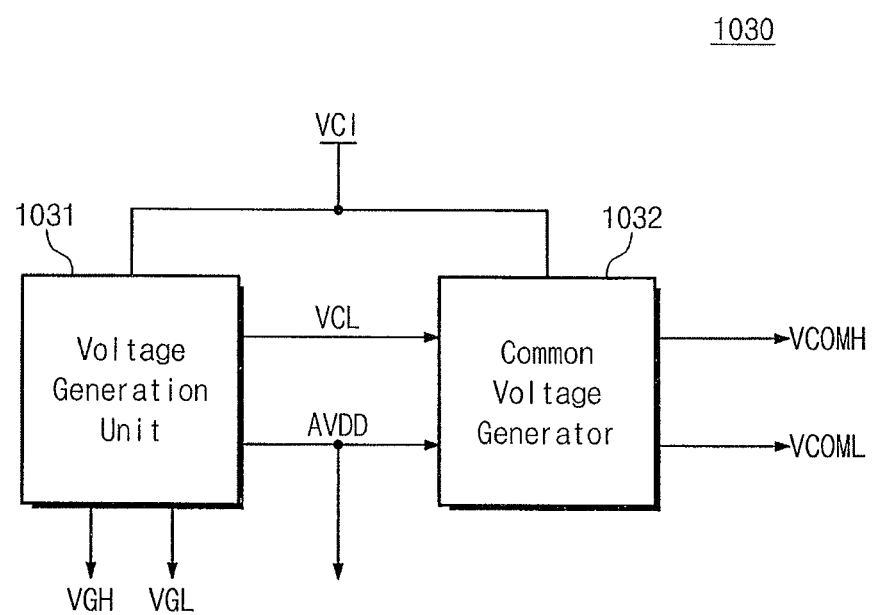
FIG. 11 illustrates a block diagram of an embodiment of the voltage generator of FIG. 10 according to an exemplary embodiment of the present invention.

FIG. 11 illustrates a block diagram of an embodiment of the voltage generator 1030 of FIG. 10 according to an exemplary embodiment of the present invention. Referring to FIG. 11, the voltage generator 1030 may include a voltage generation unit 1031 and a common voltage generator 1032.

The voltage generation unit 1031 may receive the power voltage from the outside to generate the common voltage VCL, the gate-on voltage VGH, the gate-off voltage VGL and the analog power voltage AVDD. Here, the common voltage VCL may be supplied to the common voltage generator 1032, and the gate-on voltage VGH and gate-off voltage VGL may be used in the gate driver 1040. The common voltage generator 1032 may receive the power voltage VCI, the common voltage VCL and the analog power voltage AVDD generated by the voltage generation unit 1031, and may generate the gate-on common voltage VCOMH and the gate-off common voltage VCOML to be supplied to the common electrode of the capacitors $C_{LC}$ and $C_{ST}$ in the liquid crystal panel 1050. Detailed constitution and operation of the voltage generation unit 1031 may be the same as those illustrated in FIGS. 2 through 9 and their corresponding descriptions.

The LCD 1000 according to the exemplary embodiment of the present invention may include the voltage generator 1030 for generating a variety of voltages required for operations, and the voltage generator 1030 may stably generate voltages without latch-up.

According to embodiments of the present invention, a voltage generator can stably generate a plurality of voltages without latch-up because a substrate voltage is set to a voltage lower than a ground voltage at power-on.

Embodiments of the invention may separately provide a voltage generator that may variably control a time taken for the substrate voltage to be set to a voltage lower than a ground voltage at power-on.

The above-disclosed subject matter is to be considered illustrative, and not restrictive, and the appended claims are intended to cover all such modifications, enhancements, and other embodiments, which fall within the true spirit and scope of the present invention. More particularly, exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims. Thus, to the maximum extent allowed by law, the scope of the present invention is to be determined by the broadest permissible interpretation of the following claims and their equivalents, and shall not be restricted or limited by the foregoing detailed description.

What is claimed is:

1. A voltage generator, comprising:
a boosting circuit boosting a power voltage to generate first through fourth voltages; and
a boosting controller controlling the boosting circuit such that the third and fourth voltages are set to a first voltage level lower than that of a ground voltage before the first and second voltages are generated
wherein the boosting circuit comprises:
a first booster boosting the power voltage to generate the first voltage;
a second booster receiving the power voltage, the first voltage and the fourth voltage to generate the second and third voltages; and
a third booster receiving the power voltage to generate the fourth voltage;
wherein the boosting controller generates first and second control signals for controlling the second booster, and generates a third control signal for controlling the third booster;
wherein the second booster comprises a first boosting unit generating a fifth voltage lower than the ground voltage;
wherein the second booster further comprises a first switching unit outputting the fifth voltage as the third voltage in response to the first and second control signals;
wherein the first switching unit applies the fifth voltage to a substrate in response to the first control signal; and
wherein the second booster further comprises a second switching unit transmitting the fifth voltage applied to the substrate as the third voltage in response to the second control signal.

2. The voltage generator as claimed in claim 1, wherein the second booster further comprises a second boosting unit receiving the power voltage and the first voltage to generate the second voltage.

3. The voltage generator as claimed in claim 1, wherein the boosting controller further controls the boosting circuit such that the third voltage is set to a second voltage level lower than the first voltage level after the first and second voltages are generated.

4. A liquid crystal display device, comprising:
a liquid crystal panel displaying an image; and
a voltage generator receiving a power voltage to generate first through fourth voltages for driving the liquid crystal panel,
wherein the voltage generator, includes:
a first booster boosting the power voltage to generate the first voltage;
a second booster receiving the power voltage, the first voltage and the fourth voltage to generate the second and third voltages;
a third booster receiving the power voltage to generate the fourth voltage; and
a controller controlling the second and third boosters such that the third and fourth voltages are set to a voltage level lower than that of a ground voltage before the first and second voltages are generated
wherein the controller generates first and second control signals for controlling the second booster, and generates a third control signal for controlling the third booster;
wherein the second booster comprises a first boosting unit generating a fifth voltage lower than the ground voltage;
wherein the second booster further comprises a first switching unit outputting the fifth voltage as the third voltage in response to the first and second control signals;
wherein the first switching unit applies the fifth voltage to a substrate in response to the first control signal; and
wherein the second booster further comprises a second switching unit transmitting the fifth voltage applied to the substrate as the third voltage in response to the second control signal.

5. The liquid crystal display device as claimed in claim 4, wherein the first voltage is an internal power voltage, the second voltage is a gate-on voltage for driving gate lines of the liquid crystal panel, the third voltage is a gate-off voltage for driving the gate lines of the liquid crystal panel, and the fourth voltage is a voltage for generating a common voltage supplied to the liquid crystal panel.

6. The liquid crystal display device as claimed in claim 4, wherein the controller further controls the second booster such that the third voltage is set to a second voltage level lower than the first voltage level after the first and second voltages are generated.

* * * * *